US009065752B2

(12) United States Patent
Chetlur et al.

(10) Patent No.: US 9,065,752 B2
(45) Date of Patent: Jun. 23, 2015

(54) DYNAMIC SERVICE CLASS UPGRADES IN DATA NETWORKS

(75) Inventors: Malolan Chetlur, Karnataka (IN); Umamaheswari C. Devi, Bangalore (IN); Partha Dutta, Bangalore (IN); Shivkumar Kalyanaraman, Bangalore (IN); Ravindranath Kokku, Hyderabad (IN); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 13/592,872

(22) Filed: Aug. 23, 2012

(65) Prior Publication Data
US 2014/0057592 A1   Feb. 27, 2014

(51) Int. Cl.
*H04M 11/00* (2006.01)
*H04L 12/24* (2006.01)
*H04M 15/00* (2006.01)

(52) U.S. Cl.
CPC ............ *H04L 41/147* (2013.01); *H04L 41/5029* (2013.01); *H04L 41/5064* (2013.01); *H04L 41/0896* (2013.01); *H04L 41/0893* (2013.01); *H04M 15/80* (2013.01); *H04M 15/81* (2013.01)

(58) Field of Classification Search
CPC ...................................................... H04M 11/00
USPC ........................................................ 455/405
See application file for complete search history.

(56) References Cited

U.S. PATENT DOCUMENTS

| 6,252,884 | B1 | 6/2001 | Hunter | |
|---|---|---|---|---|
| 6,301,471 | B1 * | 10/2001 | Dahm et al. | 455/405 |
| 6,587,433 | B1 | 7/2003 | Borella et al. | |
| 7,492,711 | B1 | 2/2009 | Cheung et al. | |
| 7,724,663 | B2 | 5/2010 | Arefi et al. | |
| 8,036,608 | B2 | 10/2011 | Holm | |
| 2004/0208183 | A1 | 10/2004 | Balachandran et al. | |
| 2008/0201285 | A1 | 8/2008 | Dai | |
| 2014/0018033 | A1 * | 1/2014 | Luna | 455/405 |

FOREIGN PATENT DOCUMENTS

| CN | 101448236 A | 6/2009 |
|---|---|---|
| CN | 102236563 A | 11/2011 |

(Continued)

OTHER PUBLICATIONS

Enterasys Secure Networks; "Wireless Access Points"; Jun. 2011; 11 pages.

(Continued)

*Primary Examiner* — Huy C Ho
(74) *Attorney, Agent, or Firm* — Brown & Michaels, PC; John R. Pivnichny

(57) ABSTRACT

A method, program product and system for dynamically offering upgraded services in a network. The method comprising the steps of: selecting users for a possible offer of an upgrade to services within the network, based on user activity at user devices accessing the network; obtaining network context data information regarding the user activity and the network; sequentially ordering the selected users based on a likelihood that the users will purchase the upgrade to services; determining the upgrade to services to be offered based on a service prediction availability within the network; and offering the upgrade to services to the selected users for a specific time period.

18 Claims, 6 Drawing Sheets

(56) References Cited

FOREIGN PATENT DOCUMENTS

EP  1234415 B1  1/2008
WO  2012000200 A1  1/2012

OTHER PUBLICATIONS

"Quality of Service (QoS) and Policy Management in Mobile Data Networks: Validating Service Quality to Ensure Subscriber Quality of Experience (QoE)"; Jul. 2011; IXIA; 23 pages.
Zhu, K. et al., "Optimal Bandwidth Allocation with Dynamic Service Selection in Heterogeneous Wireless Networks"; IEEE Globalcom 2010 Proceedings; 2010; 5 pages.
Brown, G., "Evolved Packet Core & Policy Management for LTE"; Heavy Reading; Jul. 2010; 8 pages.
Chen, J. et al.; Design and Implementation of Dynamic Service Negotiation Protocol (DSNP); IEEE ICC 2002; 2002; 35 pages.
International Search Report for PCT/CN2013/080860 issued on Nov. 14, 2013.

\* cited by examiner

DYNAMIC SERVICE CLASS UPGRADES IN DATA NETWORKS

BACKGROUND

The present invention relates to dynamic service class upgrades in data networks, and more specifically to dynamic service class upgrades in wireless data networks.

With the increase in the use of smart phones and other such devices that access the Internet, users have been trending towards more data-dominated usage, for example high-bandwidth application or latency sensitive applications, versus voice dominated usage with their associated devices. The telecommunication service providers have encountered challenges in providing sufficient guaranteed bandwidth and data access in a cost efficient manner which generates revenue for the telecommunication service providers.

SUMMARY

According to one embodiment of the present invention, a method of dynamically offering upgraded services in a network. The method comprising the steps of: selecting users for a possible offer of an upgrade to services within the network, based on user activity at user devices accessing the network; obtaining network context data information regarding the user activity and the network; sequentially ordering the selected users based on a likelihood that the users will purchase the upgrade to services; determining the upgrade to services to be offered based on a service prediction availability within the network; and offering the upgrade to services to the selected users for a specific time period.

According to another embodiment of the present invention, a computer program product for dynamically offering upgraded services in a network. The computer program product comprising: one or more computer-readable, tangible storage devices; program instructions, stored on at least one of the one or more storage devices, to select users for a possible offer of an upgrade to services within the network, based on user activity at user devices accessing the network; program instructions, stored on at least one of the one or more storage devices, to obtain network context data information regarding the user activity and the network; program instructions, stored on at least one of the one or more storage devices, to sequentially order the selected users based on a likelihood that the users will purchase the upgrade to services; program instructions, stored on at least one of the one or more storage devices, to determine the upgrade to services to be offered based on a service prediction availability within the network; and program instructions, stored on at least one of the one or more storage devices, to offer the upgrade to services to the selected users for a specific time period.

According to another embodiment of the present invention, a system for dynamically offering upgraded services in a network. The system comprising: one or more processors, one or more computer-readable memories and one or more computer-readable, tangible storage devices; program instructions, stored on at least one of the one or more storage devices for execution by at least one of the one or more processors via at least one of the one or more memories, to select users for a possible offer of an upgrade to services within the network, based on user activity at user devices accessing the network; program instructions, stored on at least one of the one or more storage devices for execution by at least one of the one or more processors via at least one of the one or more memories, to obtain network context data information regarding the user activity and the network; program instructions, stored on at least one of the one or more storage devices for execution by at least one of the one or more processors via at least one of the one or more memories, to sequentially order the selected users based on a likelihood that the users will purchase the upgrade to services; program instructions, stored on at least one of the one or more storage devices for execution by at least one of the one or more processors via at least one of the one or more memories, to determine the upgrade to services to be offered based on a service prediction availability within the network; and program instructions, stored on at least one of the one or more storage devices for execution by at least one of the one or more processors via at least one of the one or more memories, to offer the upgrade to services to the selected users for a specific time period.

DETAILED DESCRIPTION

It will be understood that a used herein, the term "telecommunications tower" means a wireless communication site, including the physical tower and antennas as well as all supporting radio transmission equipment, digital servers, communication equipment for connection to digital and/or analog networks, etc. . . . . .

Figure 1:
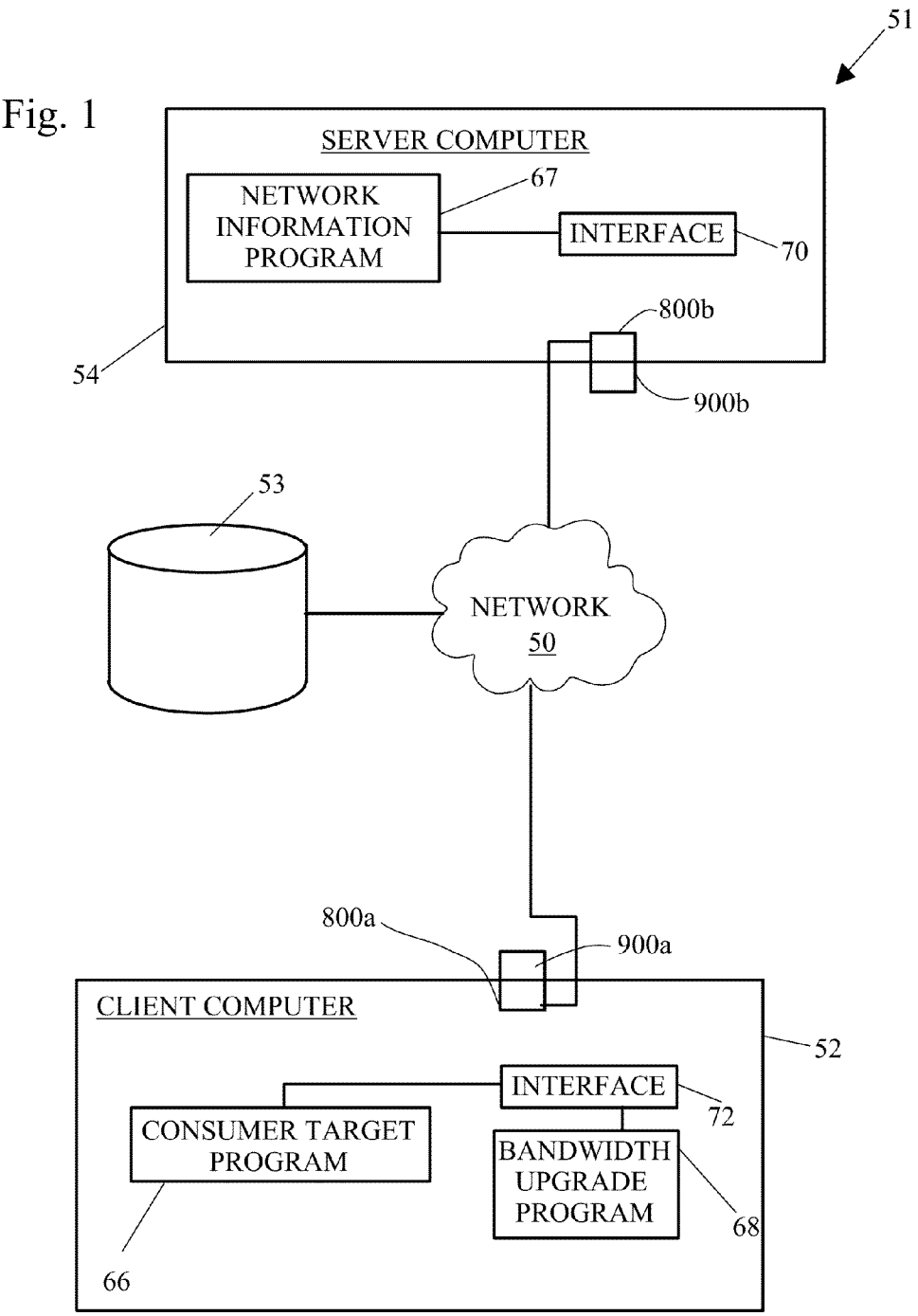
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a client computer 52, server computer 54, and a repository 53 connect to network 50. In other exemplary embodiments, network data processing system 51 may include additional client computers, storage devices, server computers, and other devices not shown. The client computer 52 includes a set of internal components 800a and a set of external components 900a, further illustrated in FIG. 6. The client computer 52 may be, for example, a mobile device, a cell phone, a personal digital assistant, a netbook, a laptop computer, a tablet computer, a desktop computer, a sequencing machine or any other type of computing device.

Server computer 54 may contain an interface 70. The interface can be, for example, a command line interface, a graphical user interface (GUI), or a web user interface (WUI). The interface may be used, for example for viewing network data information, such as bandwidth available at a time of day from a base station. The interface may also accept an input regarding thresholds and criteria for predicting the status of the bandwidth to be available.

Client computer 52 may also contain an interface 72. The interface can be, for example, a command line interface, a graphical user interface (GUI), or a web user interface (WUI). The interface may be used, for example for viewing an offer for upgraded bandwidth service by the user.

In the depicted example, server computer 54 provides information, such as boot files, operating system images, and applications to client computer 52. Server computer 54 can compute the information locally or extract the information from other computers on network 50. Server computer 54 includes a set of internal components 800b and a set of external components 900b illustrated in FIG. 6.

Figure 6:
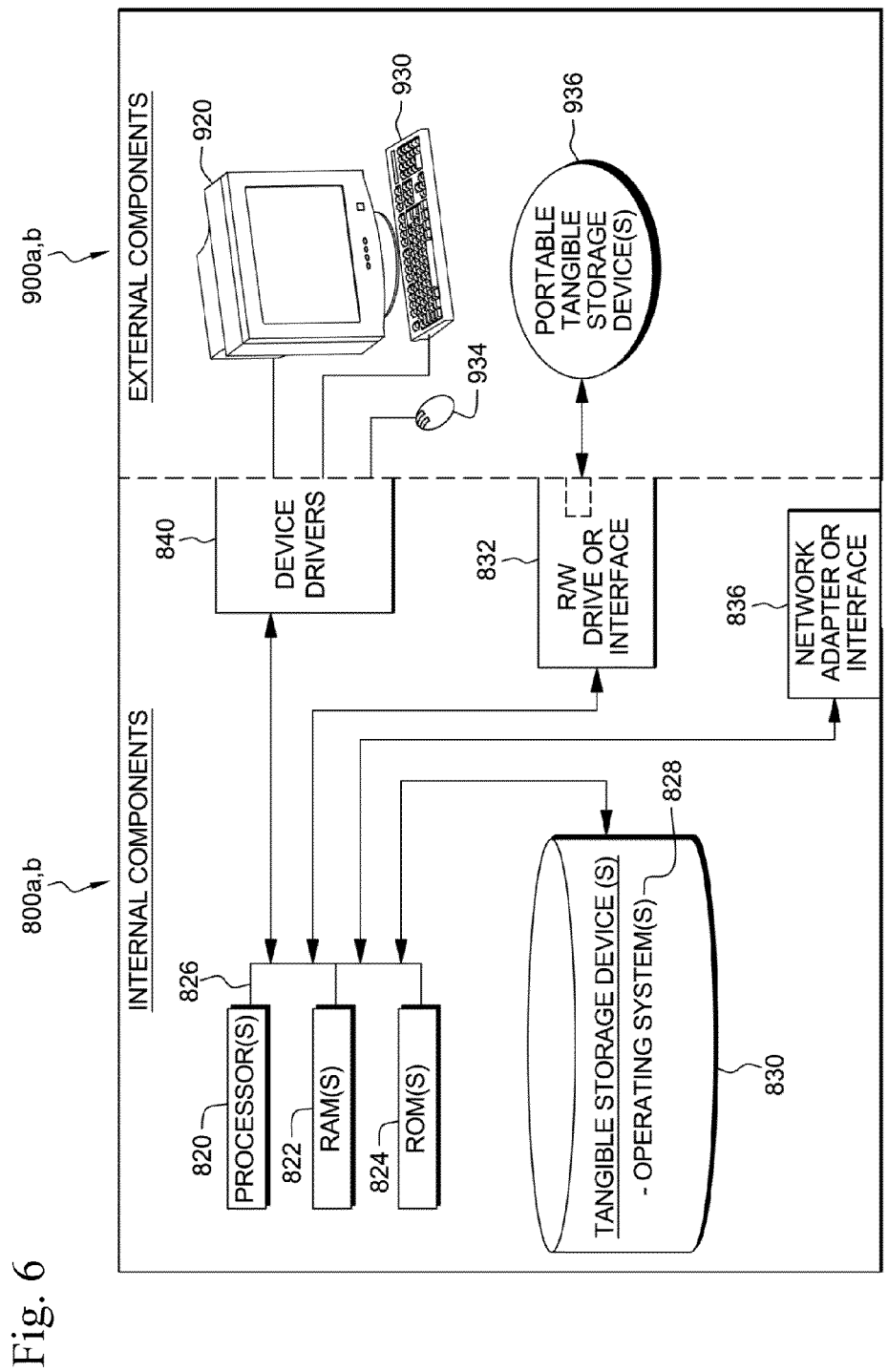
FIG. 6 illustrates internal and external components of a client computer and a server computer in which illustrative embodiments may be implemented.

Program code and programs such as a network information program 67, a bandwidth upgrade program 68, and/or a consumer target program 66 may be stored on at least one of one or more computer-readable tangible storage devices 830 shown in FIG. 6, on at least one of one or more portable computer-readable tangible storage devices 936 as shown in FIG. 6, or repository 53 connected to network 50, or downloaded to a data processing system or other device for use. For example, program code, a bandwidth upgrade program 68, and/or a consumer target program 66 may be stored on at least one of one or more tangible storage devices 830 on server computer 54 and downloaded to client computer 52 over network 50 for use on client computer 52. Alternatively, server computer 54 can be a web server, and the program code and programs such as a network information program 67, a bandwidth upgrade program 68, and/or a consumer target program 66 may be stored on at least one of the one or more tangible storage devices 830 on server computer 54 and accessed on client computer 52. A bandwidth upgrade program 68, can be accessed on client computer 52 through interface 72 and the network information program 67 and/or consumer target program can be accessed on the server computer 54 through interface 70. In other exemplary embodiments, the program code, and programs such as a network information program 67, a bandwidth upgrade program 68, and/or a consumer target program 66 may be stored on at least one of one or more computer-readable tangible storage devices 830 on client computer 52 or distributed between two or more servers.

In the depicted example, network data processing system 51 is a combination of a number of computers and servers, with network 50 representing the Internet—a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
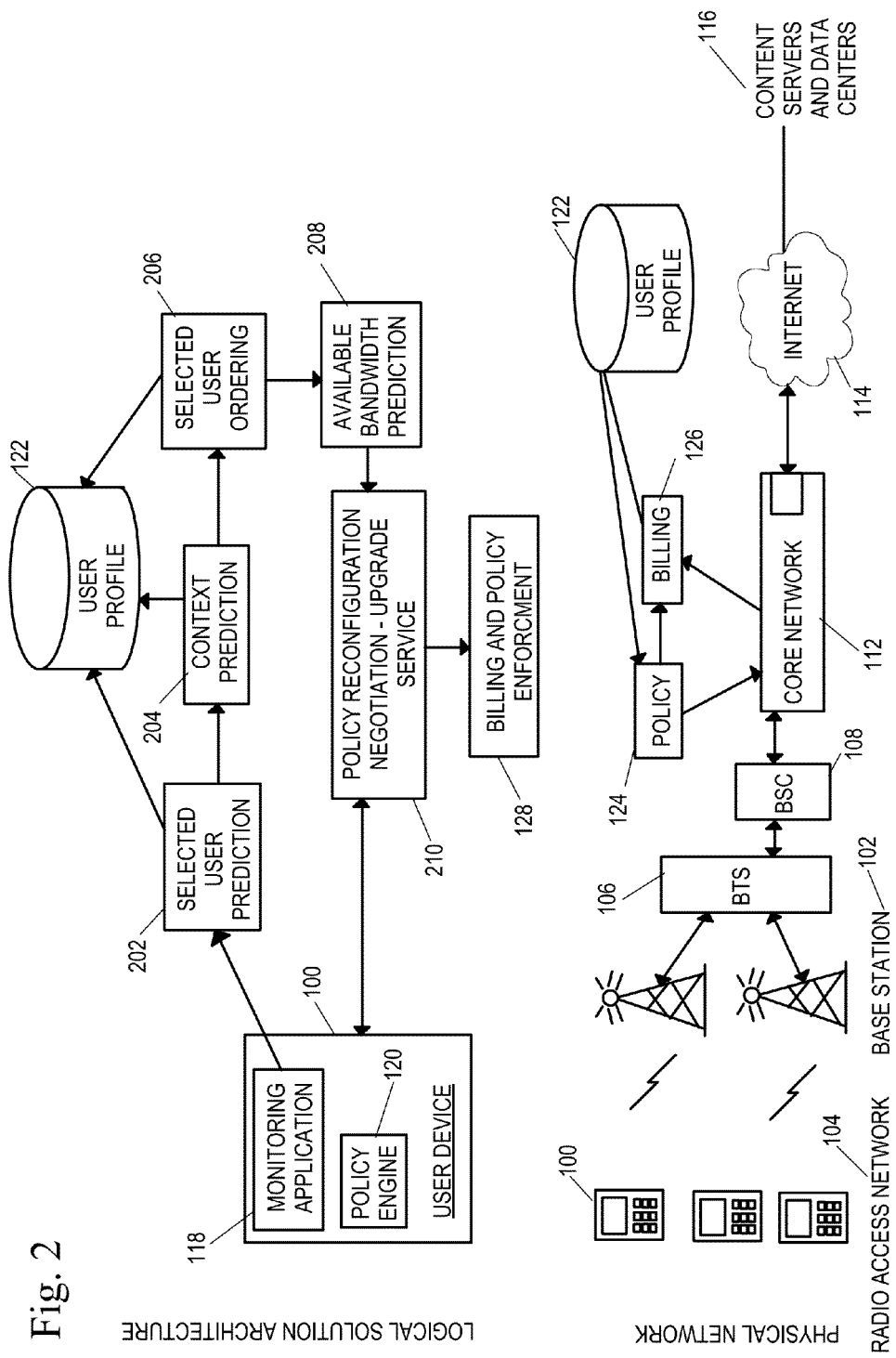
FIG. 2 shows a schematic of a dynamic service class upgrade architecture solution and the associated physical network of an embodiment of the present invention.

FIG. 2 shows a schematic of a dynamic service class upgrade architecture solution and the associated physical network of an embodiment of the present invention.

First, a pathway of a user request for data through a network data processing system using wireless telecommunications towers will be discussed. User devices 100 are in communication with wireless telecommunications towers or base stations 102 through a radio access network (RAN) 104. Any data requests made by users through their user devices 100 are sent to the wireless telecommunications towers 102. If data requested is not present at a local server (not shown), the data request is sent to a base station transceiver subsystem (BTS) 106. The BTS 106 converts the data request to a signal and sends the converted signal to a base station controller (BSC) 108. The BSC 108 converts the data content request to packets and sends the request to a core network 112, for example a general packet radio system (GPRS) core network, or another network, such as network 50. The core network 112 is connected to the Internet 114 to obtain the data content 116 requested. The data content 116 obtained via the Internet 114 is sent through the core network 112 to the BSC 108 and to the BTS 106. From the BTS 106, the data content requested is sent back to the appropriate individual wireless telecommunications towers 102. From the individual wireless telecommunication towers 102, a signal is sent to the user device 100 that originally made the request.

A user's policy 124 and billing 126 associated with the user profile 122 is associated with the core network 112.

A monitoring application 118 on the user device 100 monitors different analytic metrics, such as cumulative distribution function (CDF) of session length for each user device, estimate of current user session length, and clusters of related days. The monitoring application preferably includes a consumer target program 66 and a bandwidth upgrade program 68.

The user device also includes a policy engine 120 which maintains the information associated with the distinct service in which the user is subscribed to or distinct service class the user is participated in. Each class may be characterized by a certain statistical guarantee on a metric, such as bandwidth, delay or jitter, or a combination of these metrics. Each class also preferably includes caps on usage or quotas based on an interval of time.

Through the consumer target and bandwidth upgrade programs 66, 68 on the user device and the network information program 67, users who might want to purchase bandwidth upgrades are predicted 202, the context of the network and the projected use of bandwidth based on a history of the users' use of the network is predicted 204, the predicted or selected users are ordered 208, the available bandwidth and time associated with the availability of the bandwidth is determined 208, an upgrade service is offered to a user and the policy reconfigured and or negotiated 210, and the billing and policy is enforced 128. The method of dynamically upgrading a user's services is further described in FIGS. 3-5.

Figure 3:
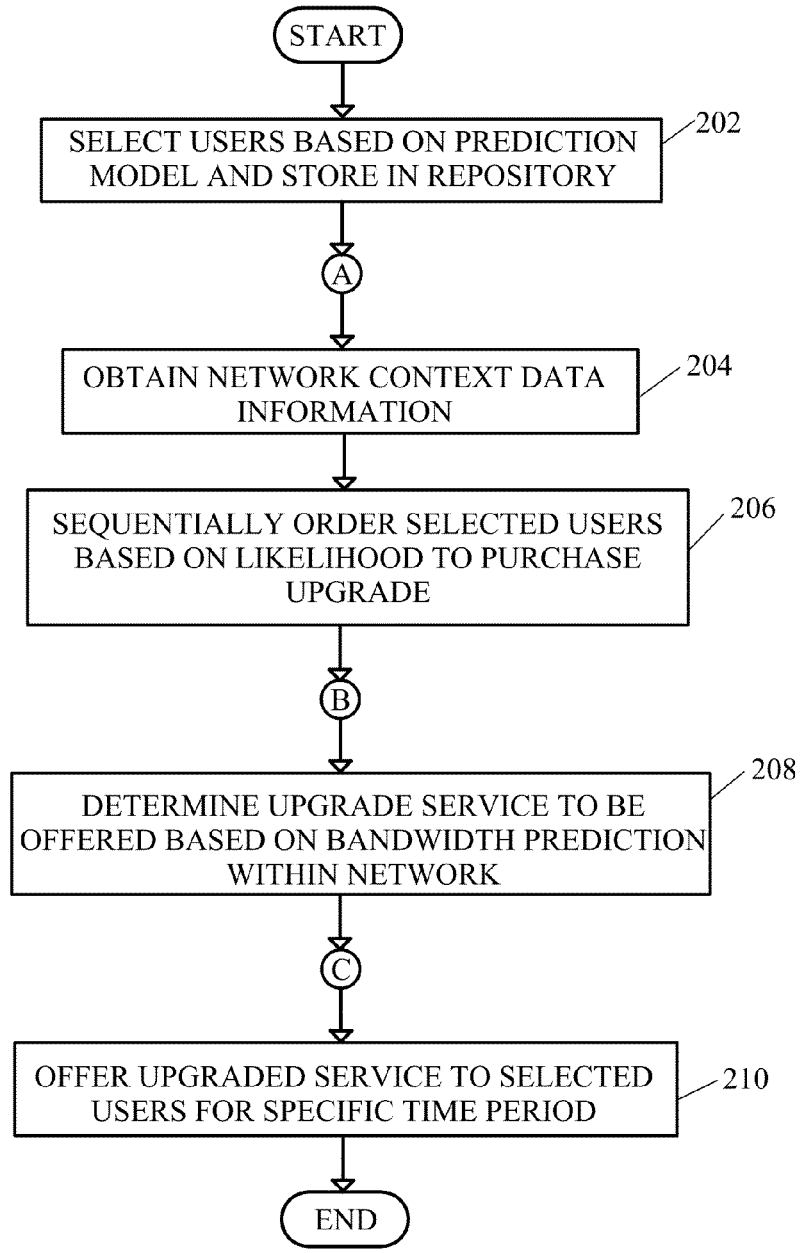
FIG. 3 shows a flowchart of a method of dynamically upgrading services in a network data system.

FIG. 3 shows a method of dynamically upgrading service as implemented in the logical solution architecture of FIG. 2. The monitoring application 118 of the user device 100 provides input to select users for bandwidth upgrades based on a prediction model and stores the selected users in a repository (step 202), for example repository 122 as shown in FIG. 2 or repository 53 as shown in FIG. 1. Step 202 of selecting users for bandwidth upgrades based on a prediction model and storing the selected users in a repository is further described and shown in FIG. 4.

Figure 4:
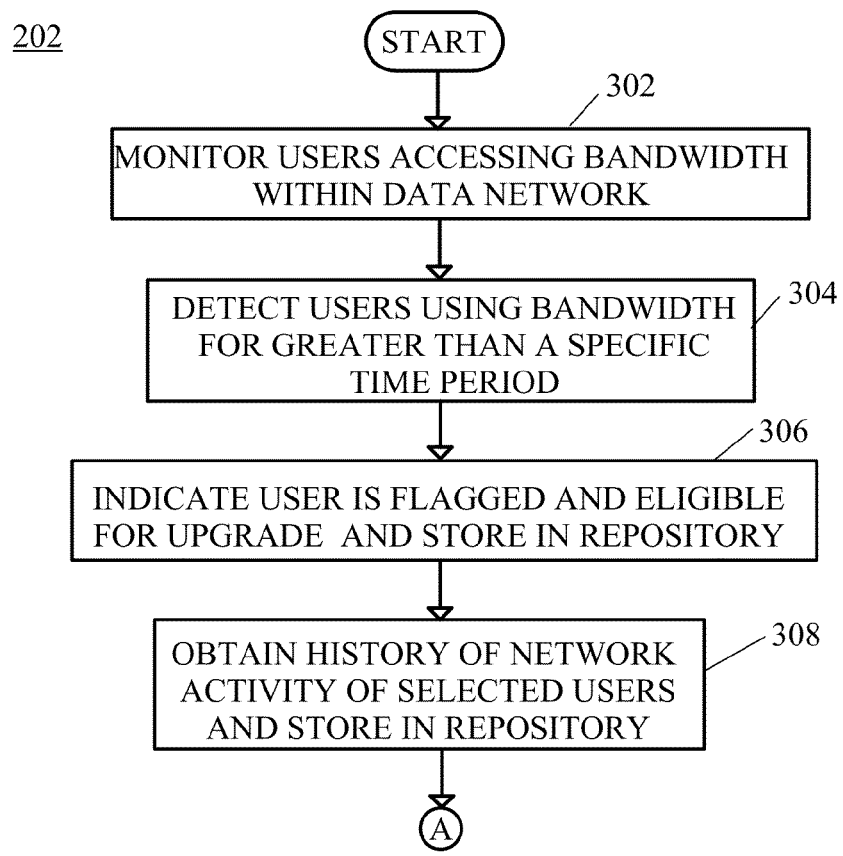
FIG. 4 shows a flowchart of a method of targeting users based on a prediction model for dynamically service class upgrading.

Referring to FIG. 4, within step 202 of selecting users for bandwidth upgrades based on a prediction model, users accessing bandwidth within the network are monitored (step 302), for example through a monitoring application 118. Users using bandwidth for greater than a set threshold are detected (step 304), and each of those users are flagged or indicated as a selected user who may be eligible for an upgrade of service. The eligible users are stored in a repository (step 306), for example repository 122 or repository 53. Then, a history of the selected user's network activity is obtained and stored in a repository (step 308).

The selected user prediction is used to predict and obtain network context data information for the users (step 204), for example using a network information program 67. Context may be obtained from the monitoring application on the user's device and/or from within the network 50. Context may include, but is not limited to a mobility profile of a selected user, bandwidth required for activity of the user, ad options of bandwidth utilized during an activity of the user. Context is herein defined to be any information that can be used to characterize the situation of an entity. The entity is a person, place or object. Context can also include base station identification. Context is stored in the user profile repository 122 or repository 53.

The context prediction is then used to sequentially order the selected users into a list based on the probability as to whether the user will actually upgrade their bandwidth service (step 206). The upgrade service to be offered to the selected users is determined based on bandwidth prediction within the network (step 208). Step 208 of offering upgraded service to selected users based on bandwidth prediction is further described and shown in FIG. 5.

Figure 5:
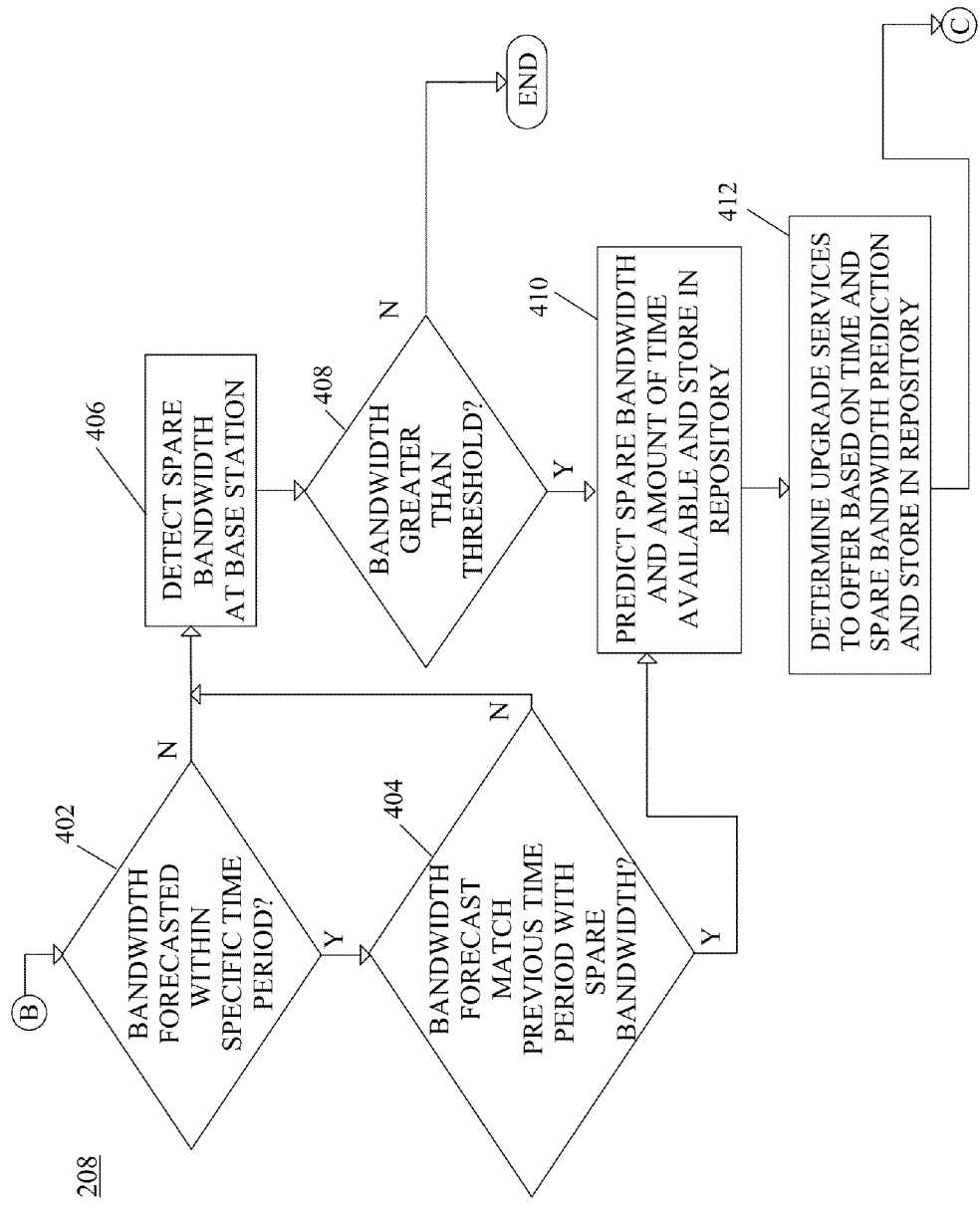
FIG. 5 shows a flowchart of a method of offering upgraded service to targeted users for a specific time period.

Referring to FIG. 5, within step 208 of offering upgraded service to selected users based on bandwidth prediction, if bandwidth is forecasted within a specific time period (step 402) and bandwidth forecast matches a previous time period with spare bandwidth (step 404), then spare bandwidth and amount of time the bandwidth will be available is predicted and stored in a repository (step 410), for example using the network information program 67 shown in FIG. 1. Using the spare bandwidth prediction and time the spare bandwidth availability prediction, the upgrade services to offer to sequentially ordered selected users (step 412) is determined, and the method continues to step 210 shown in FIG. 3.

If the bandwidth of the network has not been forecasted within a specific time period (step 402), then spare bandwidth at a base station(s) is detected (step 406). If the bandwidth is greater than a threshold (step 408), then spare bandwidth and amount of time the bandwidth will be available is predicted and stored in a repository (step 410). Using the spare bandwidth prediction and time the spare bandwidth availability prediction, the upgrade services to offer to sequentially ordered selected users are determined (step 412), and the method continues to step 210 shown in FIG. 3.

If the bandwidth of the network has been forecasted within a specific time period (step 402) and the bandwidth forecast does not match a previous time period with spare bandwidth (step 404), spare bandwidth at a base station(s) is detected (step 406). If the bandwidth is not greater than a threshold (step 408), the method ends.

If the bandwidth of the network has been forecasted within a specific time period (step 402) and the bandwidth forecast does not match a previous time period with spare bandwidth (step 404), spare bandwidth at a base station(s) is detected (step 406). If the bandwidth is greater than a threshold (step 408), then spare bandwidth and amount of time the bandwidth will be available is predicted and stored in a repository (step 410). Using the spare bandwidth prediction and time the spare bandwidth availability prediction, upgrade services to offer to sequentially ordered selected users (step 412) are determined, and the method continues to step 210 shown in FIG. 3.

The upgraded service(s) is then offered to a selected user for a specific time period (step 210), for example with the bandwidth upgrade program 68 as shown in FIG. 1. The upgraded service offered may for example be available service classes to increase the bandwidth or speed for the user to choose from. The upgraded service may also be an increased bandwidth for a time period that corresponds to average time period of a user's use of certain application or for a prescribed activity, such as watching a movie. The upgraded service may offer an upgrade of one resource that uses up a portion of a quota of another resource, for example offering an upgrade of bandwidth to users in return for x number of minutes or so many text messages allotted to the user for the month. The upgraded service may also offer an explicit trade between a resource that is constrained against a resource that is underutilized. For example, trading an upgrade to bandwidth for some number of minutes of voice calls.

It should be noted that the user may configure their policy engine 120 on their user device 100 to automate a response to the network's offer for an upgrade of service.

Alternatively, the method of dynamically upgrading services of the present invention may be implemented by monitoring available feedback from the base stations 102 through the monitoring application 118 and then continue through steps 202 through steps 208. The analytic metrics monitored regarding the base stations include the available bandwidth during specific periods of the day, based on periodic or on-demand sampling per base station, and the history of latency of jitter achievable with the time of day and clusters of related days.

In an example of dynamically upgrading services in a network, the method may be applied as follows. A user using a phone or other device running an application that requires significant bandwidth and speed, for example watching a video, is detected by a monitoring application within the device. If the activity occurs for greater than x number of minutes, the user is flagged as a possible candidate for an upgrade and the history of the user's network activity is stored in a repository. Next, the network context information is obtained. In this example, the network context information may be that a higher resolution video is available or that the current bandwidth available to the user with their current service is insufficient. The selected users are ordered based on likelihood to purchase an upgrade. Bandwidth of the network is forecast for a specific time period, e.g. between 7-10 pm, by using actual bandwidth used during a previous day at that time period. Using this forecast, the network can predict if any spare bandwidth will be present within the specific time period on this day—in other words, whether the bandwidth within the network at this time is being underutilized. If there is a forecast of spare bandwidth, determine what upgrade service to offer the user—for example additional bandwidth to the user watching the video—and for how long—for example for the next 3 hours. This will enable the user to watch a higher resolution version of the video. The upgrade is offered to the user and the user can decide whether to upgrade their service. If the user upgrades their service, the policy regarding bandwidth is updated and the user billed accordingly.

The illustrative embodiments of the present invention recognize that often times bandwidth within a network is being underutilized. The illustrative embodiments of the present invention also recognize that by monitoring activity of users and identifying candidate users for bandwidth upgrades based on context is a resource efficient way of explicit advertisement of spare resources of the telecommunication providers, therefore generating additional revenue for the telecommunication providers. The illustrative embodiments of the present invention also recognize that by offering upgrades to users based on their context, user are more likely to be motivated to purchase an upgrade of service than if the user has to specifically request an upgrade of service FIG. 6 illustrates internal and external components of client computer 52 and server computer 54 in which illustrative embodiments may be implemented. In FIG. 6, client computer 52 and server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, network information program 67, bandwidth upgrade program 68, and a consumer target program 66 are stored on one or more of the computer-readable tangible storage devices 830 for execution by one or more of the processors 820 via one or more of the RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A network information program 67, a bandwidth upgrade program 68, and a consumer target program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. A network information program 67, a bandwidth upgrade program 68, and a consumer target program 66 can be downloaded to client computer 52 and server computer 54 from an external computer via a network (for example, the Internet, a local area network or other, wide area network) and network adapter or interface 836. From the network adapter or interface 836, a network information program 67, a bandwidth upgrade program 68, and a consumer target program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

A network information program 67, a bandwidth upgrade program 68, and a consumer target program 66 can be written in various programming languages including low-level, high-level, object-oriented or non object-oriented languages. Alternatively, the functions of a network information program 67, a bandwidth upgrade program 68, and a consumer target program 66 can be implemented in whole or in part by computer circuits and other hardware (not shown).

Based on the foregoing, a computer system, method, and program product have been disclosed for dynamically offering upgraded services in a network. However, numerous modifications and substitutions can be made without deviating from the scope of the present invention. Therefore, the present invention has been disclosed by way of example and not limitation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of dynamically offering upgraded services in a network comprising the steps of:
   selecting users for a possible offer of an upgrade to services within the network, based on user activity at user devices accessing the network;
   obtaining network context data information regarding the user activity and the network;
   ordering the selected users in a sequential order based on a likelihood that the users will purchase the upgrade to services;
   determining the upgrade to services to be offered to selected users in the sequential order based on a service prediction availability within the network of a predicted amount of bandwidth available and an amount of time the bandwidth will be available; and
   offering the upgrade to services to the selected users in the sequential order until all available bandwidth has been offered to the selected users for the amount of time the bandwidth will be available.

2. The method of claim 1, wherein the step of selecting users for a possible offer of an upgrade to services further comprises the steps of:
   monitoring users accessing bandwidth within the data network through the user devices;
   detecting users using bandwidth for greater than a specific time period;
   selecting users eligible for the upgrade to services; and
   obtaining a history of network activity of the selected users.

3. The method of claim 1, wherein the step of determining the upgrade to services to be offered further comprises the step of:
   if there is no available data on bandwidth usage of the network for the specific time period in an earlier day, detecting spare bandwidth within the network, and if the bandwidth available is greater than a threshold amount, predicting the amount of bandwidth available and the amount of time the bandwidth will be available.

4. The method of claim 1, wherein the step of determining the upgrade to services to be offered further comprises the step of:
   if there is available data on bandwidth usage of the network for the specific time period in an earlier day, and the network had spare bandwidth during the specific time period in the earlier day, predicting the amount of bandwidth available and the amount of time the bandwidth will be available.

5. The method of claim 1, wherein the upgrade to services offered to the selected users requires an exchange of an underutilized resource for the upgrade to service.

6. The method of claim 1, wherein the upgrade to services offered to the selected users utilizes credit against another service of the selected user.

7. A computer program product for dynamically offering upgraded services in a network comprising:
   one or more computer-readable, non-transitory tangible storage devices;
   program instructions, stored on at least one of the one or more storage devices, to select users for a possible offer of an upgrade to services within the network, based on user activity at user devices accessing the network;
   program instructions, stored on at least one of the one or more storage devices, to obtain network context data information regarding the user activity and the network;
   program instructions, stored on at least one of the one or more storage devices, to order the selected users in a sequential order based on a likelihood that the users will purchase the upgrade to services;

program instructions, stored on at least one of the one or more storage devices, to determine the upgrade to services to be offered to selected users in the sequential order based on a service prediction availability within the network of a predicted amount of bandwidth available and an amount of time the bandwidth will be available; and program instructions, stored on at least one of the one or more storage devices, to offer the upgrade to services to the selected users in the sequential order until all available bandwidth has been offered to selected users for the amount of time the bandwidth will be available.

8. The program product of claim 7, wherein the program instructions, stored on at least one of the one or more storage devices, to select users for a possible offer of an upgrade to services further comprises program instructions, stored on at least one of the one or more storage devices, to:

monitor users accessing bandwidth within the data network through the user devices;

detect users using bandwidth for greater than a specific time period;

select users eligible for the upgrade to services; and obtain a history of network activity of the selected users.

9. The program product of claim 7, wherein the program instructions, stored on at least one of the one or more storage devices, to determine the upgrade to services to be offered further comprises program instructions of:

if there is no available data on bandwidth usage of the network for the specific time period in an earlier day, detecting spare bandwidth within the network, and if the bandwidth available is greater than a threshold amount, program instructions, stored on at least one of the one or more storage devices, to predict the amount of bandwidth available and the amount of time the bandwidth will be available.

10. The program product of claim 7, wherein the program instructions, stored on at least one of the one or more storage devices, to determine the upgrade to services to be offered further comprises program instructions of:

if there is available data on bandwidth usage of the network for the specific time period in an earlier day, and the network had spare bandwidth during the specific time period in the earlier day, program instructions, stored on at least one of the one or more storage devices, to predict the amount of bandwidth available and the amount of time the bandwidth will be available.

11. The program product of claim 7, wherein the upgrade to services offered to the selected users requires an exchange of an underutilized resource for the upgrade to service.

12. The program product of claim 7, wherein the upgrade to services offered to the selected users utilizes credit against another service of the selected user.

13. A computer system for dynamically offering upgraded services in a network comprising:

one or more processors, one or more computer-readable memories and one or more computer-readable, non-transitory tangible storage devices;

program instructions, stored on at least one of the one or more storage devices for execution by at least one of the one or more processors via at least one of the one or more memories, to select users for a possible offer of an upgrade to services within the network, based on user activity at user devices accessing the network;

program instructions, stored on at least one of the one or more storage devices for execution by at least one of the one or more processors via at least one of the one or more memories, to obtain network context data information regarding the user activity and the network;

program instructions, stored on at least one of the one or more storage devices for execution by at least one of the one or more processors via at least one of the one or more memories, to order the selected users in a sequential order based on a likelihood that the users will purchase the upgrade to services;

program instructions, stored on at least one of the one or more storage devices for execution by at least one of the one or more processors via at least one of the one or more memories, to determine the upgrade to services to be offered to selected users in the sequential order based on a service prediction availability within the network of a predicted amount of bandwidth available and an amount of time the bandwidth will be available; and program instructions, stored on at least one of the one or more storage devices for execution by at least one of the one or more processors via at least one of the one or more memories, to offer the upgrade to services to the selected users in the sequential order until all available bandwidth has been offered to the selected users for the amount of time the bandwidth will be available.

14. The system of claim 13, wherein the program instructions, stored on at least one of the one or more storage devices for execution by at least one of the one or more processors via at least one of the one or more memories, to select users for a possible offer of an upgrade to services further comprises program instructions, stored on at least one of the one or more storage devices for execution by at least one of the one or more processors via at least one of the one or more memories, to:

monitor users accessing bandwidth within the data network through the user devices;

detect users using bandwidth for greater than a specific time period;

select users eligible for the upgrade to services; and obtain a history of network activity of the selected users.

15. The system of claim 13, wherein the program instructions, stored on at least one of the one or more storage devices for execution by at least one of the one or more processors via at least one of the one or more memories, to determine the upgrade to services to be offered further comprises program instructions of:

if there is no available data on bandwidth usage of the network for the specific time period in an earlier day, detecting spare bandwidth within the network, and if the bandwidth available is greater than a threshold amount, program instructions, stored on at least one of the one or more storage devices for execution by at least one of the one or more processors via at least one of the one or more memories, to predict the amount of bandwidth available and the amount of time the bandwidth will be available.

16. The system of claim 13, wherein the program instructions, stored on at least one of the one or more storage devices for execution by at least one of the one or more processors via at least one of the one or more memories, to determine the upgrade to services to be offered further comprises program instructions of:

if there is available data on bandwidth usage of the network for the specific time period in an earlier day, and the network had spare bandwidth during the specific time period in the earlier day, program instructions, stored on at least one of the one or more storage devices for execution by at least one of the one or more processors via at least one of the one or more memories, to predict the amount of bandwidth available and the amount of time the bandwidth will be available.

17. The system of claim 13, wherein the upgrade to services offered to the selected users requires an exchange of an underutilized resource for the upgrade to service.

18. The system of claim 13, wherein the upgrade to services offered to the selected users utilizes credit against another service of the selected user.

* * * * *